US012250215B2

(12) United States Patent
Wetterwald et al.

(10) Patent No.: US 12,250,215 B2
(45) Date of Patent: Mar. 11, 2025

(54) TECHNIQUES FOR DEVICE TO DEVICE AUTHENTICATION

(71) Applicant: Cisco Technology, Inc., San Jose, CA (US)

(72) Inventors: Patrick Wetterwald, Mouans Sartoux (FR); Jonas Zaddach, Antibes (FR); Pascal Thubert, Roquefort les Pins (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 206 days.

(21) Appl. No.: 16/986,923

(22) Filed: Aug. 6, 2020

(65) Prior Publication Data
US 2022/0046014 A1    Feb. 10, 2022

(51) Int. Cl.
*H04L 9/40* (2022.01)

(52) U.S. Cl.
CPC ...... *H04L 63/0884* (2013.01); *H04L 63/0853* (2013.01); *H04L 63/16* (2013.01); *H04L 2463/082* (2013.01)

(58) Field of Classification Search
CPC . H04L 63/0884; H04L 63/0853; H04L 63/16; H04L 2463/082; H04L 63/0876; H04W 12/06
See application file for complete search history.

(56) References Cited

U.S. PATENT DOCUMENTS

| | | | |
|---|---|---|---|
| 7,076,556 B1* | 7/2006 | Brock | H04L 67/568 709/228 |
| 9,723,003 B1 | 8/2017 | McClintock et al. | |
| 9,754,097 B2 | 9/2017 | Hessler | |
| 9,858,405 B2 | 1/2018 | Ranadive et al. | |
| 10,057,227 B1 | 8/2018 | Hess et al. | |
| 10,169,567 B1* | 1/2019 | Pentz | G06F 21/44 |
| 10,484,377 B1 | 11/2019 | Mossoba et al. | |
| 2003/0217151 A1 | 11/2003 | Roese et al. | |
| 2007/0067642 A1* | 3/2007 | Singhal | G07C 9/257 713/186 |

(Continued)

OTHER PUBLICATIONS

The International Search Report and Written Opinion for PCT Application No. PCT/US21/42844, mailed Oct. 28, 2021.

(Continued)

*Primary Examiner* — Huan V Doan
(74) *Attorney, Agent, or Firm* — Lee & Hayes, P.C.

(57) ABSTRACT

This disclosure describes techniques for device to device authentication. For instance, a first device may detect a second device, such as when a user physically attaches the second device to the first device or when the second device wireless communicates with the first device. A component of the first device and/or an authentication entity may then determine to authenticate the second device. In some instances, the component determines to authenticate the second device using information associated with an environment of the second device. To authenticate the second device, the authentication entity may send a request to a user, receive a response from the user, and then verify the response. After the authentication, the first device may determine that the second device includes a trusted device and establish a connection with the second device.

16 Claims, 7 Drawing Sheets

(56) References Cited

U.S. PATENT DOCUMENTS

| | | | | |
|---|---|---|---|---|
| 2007/0110035 | A1* | 5/2007 | Bennett | H04L 45/24 |
| | | | | 370/465 |
| 2008/0282347 | A1 | 11/2008 | Dadhia et al. | |
| 2009/0037594 | A1* | 2/2009 | Sever | E21B 47/024 |
| | | | | 709/227 |
| 2010/0302374 | A1* | 12/2010 | Ebara | G06Q 20/40 |
| | | | | 348/E7.085 |
| 2012/0214577 | A1* | 8/2012 | Petersen | G06F 21/34 |
| | | | | 463/25 |
| 2014/0115675 | A1* | 4/2014 | Jung | H04L 67/10 |
| | | | | 726/9 |
| 2015/0381621 | A1 | 12/2015 | Innes | |
| 2017/0195339 | A1* | 7/2017 | Brown | H04W 4/80 |
| 2018/0048647 | A1* | 2/2018 | Favila | H04L 67/10 |
| 2018/0069867 | A1 | 3/2018 | Grajek et al. | |
| 2018/0212957 | A1* | 7/2018 | Lee | H04L 63/0869 |
| 2018/0375841 | A1* | 12/2018 | Tola | H04L 9/3239 |
| 2019/0273733 | A1 | 9/2019 | Kawabata | |

OTHER PUBLICATIONS

Indian Office Action mailed Feb. 1, 2024 for Indian Application No. 202327002109, a foreign counterpart to U.S. Appl. No. 16/986,923, 8 pages.

* cited by examiner

TECHNIQUES FOR DEVICE TO DEVICE AUTHENTICATION

TECHNICAL FIELD

The present disclosure relates generally to authenticating devices using an authentication entity.

BACKGROUND

There are many instances when devices attempt to connect to one another in order to send and receive data. For example, if a user attaches a first device to a second device, such as by inserting a Universal Serial Bus (USB) device into a computer, the first device will attempt to establish a mechanical connection with the second device. For a second example, if a first device attempts to wirelessly connect to a second device, such as when the second device includes a network device (e.g., router) that provides the first device with network access, the first device will attempt to establish a wireless connection with the second device. However, when devices attempt to connect with one another without a user establishing the connection, problems may occur. For example, the device attempting to connect to the other device may not be trusted by a user of the other device.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1:
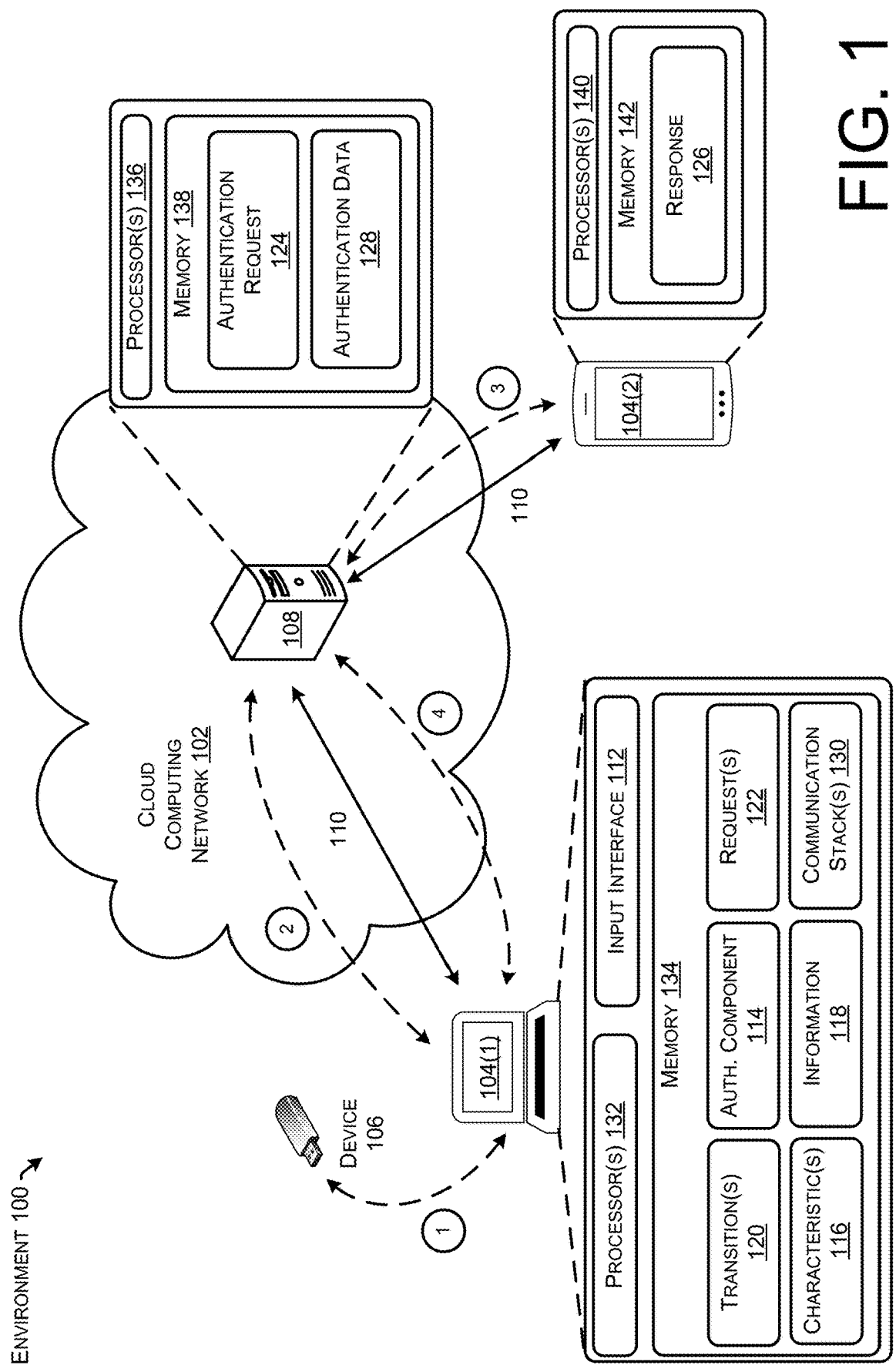
FIG. 1 illustrates a component diagram with a first example environment in which cloud authentication concepts may be employed, in accordance with the present concepts.

This disclosure describes, at least in part, a first electronic device configured to detect a second electronic device and determine, using a component of a communication stack, to authenticate the second electronic device using an authentication service. The first electronic device is further configured to send, to one or more devices associated with the authentication service, a request to authenticate the second electronic device. Additionally, the first electronic device is configure to receive, from the one or more devices, an indication that the one or more devices authenticated the second electronic device.

This disclosure also describes, at least in part, a method that includes detecting, by a first electronic device, that a second electronic device is attempting to establish a direct connection with a first electronic device. The method further includes determining, by the first electronic device, to authenticate the second electronic device using an authentication service. Additionally, the method includes sending, to one or more devices associated with the authentication service, a request to authenticate the second electronic device and receiving, from the one or more devices, an indication that the one or more devices authenticated the second electronic device.

This disclosure also describes, at least in part, a first electronic device configured to store first information representing a first state of an environment of a second electronic device. The first electronic device is further configured to receive second information representing a second state of the environment of the second electronic device. Additionally, the first electronic device is configured to determine to authenticate the second electronic device based at least in part on the first information and the second information and send, to one or more devices associated with an authentication service, a request to authenticate the second electronic device.

Example Embodiments

This disclosure describes, at least in part, techniques that may be implemented by an electronic device that is coupled to an authentication entity as well as one or more other electronic devices. For instance, the electronic device may use the authentication entity to authenticate the other electronic device(s) as trusted device(s). This may occur when the electronic device detects that the other electronic device(s) are attempting to establish connection(s) with the electronic device. In some instances, the authentication entity may authenticate the other electronic device(s) using multi-factor authentication. For example, after receiving a request to authenticate another electronic device, the authentication entity may send an authentication request to a user associated with the electronic device. The authentication entity may then receive, from a user device, a response to the authentication request. After determining that the response is valid, the authentication entity may send an indication to the electronic device that the other electronic device is trusted. This way, the electronic device is able to authenticate the other electronic device(s), such as when the other electronic device(s) attempt to establish the connection(s) with the electronic device.

For more detail, an electronic device (which may be referred to, in these examples, as a "first electronic device") may detect a second electronic device. In some instances, the first electronic device detects the second electronic device based on the second electronic device attempting to establish a mechanical connection with the first electronic device. For example, if the second electronic device includes a Universal Serial Bus (USB) device, then the first electronic device may detect the second electronic device based on the second electronic device being inserted into a USB port of the first electronic device. Additionally, or alternatively, in some instances, the first electronic device may detect the second electronic device based on the second electronic device attempting to establish a wireless connection with the first electronic device. For example, if the first electronic device includes a network device, such as a router, then the first electronic device may detect the second electronic device based on the second electronic device sending a request to establish the wireless connection.

In some instances, the first electronic device may receive account data from the second electronic device. For example, such as when the first electronic device includes the network device, the first electronic device may receive account data, such as credentials, from the second electronic device. The first electronic device may then attempt to initially authenticate the second electronic device using the credentials. For example, the first electronic device may match the credentials to saved credentials associated with a user account. Based on the match, the first electronic device may initially authenticate the second electronic device.

In some instances, the first electronic device may include a component that determines when to authenticate the second electronic device, as a trusted electronic device, using the authentication entity. In some instances, the component may include software that is placed within a communication stack of the first electronic device, where the communication stack is used to communicate with the second electronic device. For example, if the second electronic device includes the USB device, then the component may include software that is placed within the device driver associated with the USB port. In some instances, the component is placed within one or more layers of the communication stack of the first electronic device. For example, the component may be placed within the first layer, the second layer, the third layer, the fourth layer, the fifth layer, and/or the like associated with the communication stack.

For example, the component may be placed within a physical layer (e.g., layer 1), a data link layer (e.g., layer 2), a network layer (e.g., layer 3), a transport layer (e.g., layer 4), a session layer (e.g., layer 5), a presentation layer (e.g., layer 6), an application layer (e.g., layer 7), and/or so forth of a communication stack. In some instances, the component is placed within the layer that is associated with the type of information that the component is configured to analyze. For example, if the component is configured to analyze information about the network being utilized by the second electronic device, then the component may be placed within the second layer of the communication stack.

The first electronic device may use the component in order to determine whether to authenticate the second electronic device using thee authentication entity. In some instances, the component may determine to authenticate the second electronic device each time that the first electronic device detects the second electronic device. Additionally, or alternatively, in some instances, the first electronic device may use one or more characteristics associated with a state of an environment of the second electronic device in order to determine whether to authenticate the second electronic device. As described herein, the characteristic(s) may include, but are not limited to, a unique device identifier associated with the second electronic device, hardware associated with the second electronic device (e.g., hardware installed on the second electronic device), software installed on the second electronic device, one or more applications that are active on the second electronic device, central processing unit (CPU) usage associated with the second electronic device, memory usage associated with the second electronic device, an address (e.g., a media access control (MAC) address, an Internet Protocol (IP) address, etc.) associated with the second electronic device, power consumption associated with the second electronic device, a type of network connection (e.g., mechanical, wireless, etc.), one or more other devices for which the second electronic device is communicating (e.g., via Bluetooth, WiFi, etc.), sensor data representing a user of the second electronic device, a location of the second electronic device, and/or the like.

For example, the first electronic device may receive information representing the characteristic(s) from the second electronic device. The component may then analyze the characteristic(s) in order to determine whether to authenticate the second electronic device using the authentication entity. In some instances, the component may determine to authenticate the second electronic device based on determining that the second electronic device includes a new electronic device for which the first electronic device has not previously connected. For a first example, the component may determine to authenticate the second electronic device based on the information representing a new address (e.g., a new MAC address, a new IP address, etc.). For a second example, the component may determine to authenticate the second electronic device based on the information representing a new identifier (e.g., a new unique device identifier).

Additionally, or alternatively, in some instances, the component may determine to authenticate the second electronic device based on transitions associated with the environment of the second electronic device. For example, the first electronic device may store information representing previous characteristic(s) associated with a previous state of the of the environment of the second electronic device. The component may then compare the characteristic(s) associated with the environment, as represented by the received information, to the previous characteristic(s) associated with the environment. Based on the comparison, the component may identify transition(s) between a current state of the environment and previous state(s) of the environment. As described herein, the transition(s) may include, but are not limited to, a change in the unique device identifier, a change in the hardware associated with the second electronic device, a change in the software installed on the second electronic device, a change in the one or more applications that are active on the second electronic device, a change in the CPU usage associated with the second electronic device, a change in the memory usage associated with the second electronic device, a change in the address associated with the second electronic device, a change in the power consumption associated with the second electronic device (e.g., whether the second electronic device was continuously receiving power or whether the second electronic device stopped receiving power for period(s) of time), a change in the type of network connection associated with the second electronic device, a change in the user of the second electronic device (as determined using the sensor data), a change in the location of the second electronic device, and/or any other state change.

The component may then use the transition(s) to determine whether to reauthenticate the second electronic device using the authentication entity. For a first example, if the transition(s) indicate that the current state of the environment is similar to previous state(s) of the environment, then the component may determine not to reauthenticate the second electronic device using the authentication entity. In some instances, the component may determine that the transition(s) indicate that the current state of the environment is similar to the previous state(s) of the environment when there is little variance between the compared characteristic(s). For instance, if the transition(s) only indicate a small change in the CPU usage (e.g., 1%, 5%, 10%, etc.) and/or a small change in the memory usage (e.g., 1%, 5%, 10%, etc.), then the component may determine that the current state of the environment is similar to the previous state(s) of the environment. Additionally, if the transition(s) only indicate that a new software application was activated on the second electronic device, then the component may determine that the current state of the environment is still similar to the previous state(s) of the environment.

For a second example, if the transition(s) indicate that the current state of the environment is different than the previous state(s) of the environment, then the component may determine to reauthenticate the second electronic device using the authentication entity. In some instances, the component may determine that the transition(s) indicate that the current state of the environment is different than the previous state(s) of the environment when there is a large variance between the compared characteristic(s). For instance, if the transition(s) indicate a large change in the CPU usage (e.g., 75%, 80%, 90%, etc.) and/or a large change in the memory usage (e.g., 75%, 80%, 90%, etc.), then the component may determine that the current state of the environment is different than the previous state(s) of the environment. Additionally, if the transition(s) indicate that the second electronic device is using a new IP address and/or has a new unique device identifier, then the component may again determine that the current state of the environment is different than the previous state(s) of the environment.

In some instances, the component may analyze the information in order to identify "triggering events" associated with the environment of the second electronic device. As described herein, a triggering event may include, but is not limited to, malicious hardware/software identified on the second electronic device (e.g., malware), a change in the unique device identifier, a change in the IP address, a change in the MAC address, an unsecured network connection, and/or the like. In some instances, when the component identifies a triggering event, the component may determine to reauthenticate the second electronic device using the authentication entity.

In some instances, when identifying the transition(s), the component may use one or more machine learned models to identify the transition(s) associated with the current state of the environment. For example, the machine learned model(s) may be configured to analyze characteristic(s) associated with the environment of the second electronic device, such as each time the component determines the characteristic(s). Based on the analysis, the machine learned model(s) identify (e.g., learn) characteristic(s) that remain substantially constant. For example, the machine learned model(s) may identify that the second electronic device usually uses the same address, usually uses the same unique device identifier, includes a CPU usage that falls within a given range, includes application(s) that are usually active on the user device, and/or the like. The component may then compare new characteristic(s) to the learned characteristic(s) in order to identify the transition(s). When using machine learned model(s) to identify the transition(s), the transition(s) may correspond to "anomalies" with the second electronic device.

In some instances, to authenticate the second electronic device, the first electronic device may send, to the authentication entity, a request to authenticate the second electronic device. In some instances, the request may include at least a portion of the information received from the second electronic device. The authentication entity may then perform multi-factor authentication in order to authenticate the second electronic device. For example, the authentication entity may generate the authentication request. As described herein, the authentication request may include, but is not limited to, a code, a question, a password, a push notification, and/or any other factor that may be used to authenticate the second electronic device. The authentication entity may then send the authentication request to a user (e.g., via email, message, an application, push notification, etc.) associated with the first electronic device.

Based on sending the authentication request, the authentication entity may receive, from the first electronic device and/or another electronic device associated with the user, a response to the authentication request. The authentication entity may then determine whether the response is valid for the authentication request. For example, if the authentication request includes a code that the user must input to authenticate the second electronic device, then the response may include the code. As such, the authentication entity may determine that the response is valid when the code input by the user includes the same code as the authentication request. After authenticating the second electronic device, the authentication entity may send, to the first electronic device, authentication data indicating that the second electronic device has been authenticated.

In some instances, the authentication data may include a token, cookie, and/or other type of data that the first electronic device uses to determine that the second electronic device is trusted. In some instances, the authentication data may include a duration for which the authentication entity verifies that the second electronic device may be trusted. As described herein, a duration may include, but is not limited to, one hour, one day, one week, and/or any other period of time. In some instances, the authentication entity uses the transition(s) in order to determine the duration for the authentication data.

For a first example, if the transition(s) indicate that the current state of the environment is similar to previous state(s) of the environment, then the authentication entity may determine the duration by increasing a previous duration associated with a previous session when the authentication entity authenticated the second electronic device. In some instances, the greater the similarities between the current state of the environment and the previous state(s) of the environment, the greater the increase that the authentication entity uses when determining the duration. For a second example, if the transition(s) indicate that the current state of the environment is different than the previous state(s) of the environment, then the authentication entity may determine the duration by decreasing the previous duration associated with the previous session when the authentication entity authenticated the second electronic device. In some instances, the greater the differences between the current state of the environment and the previous state(s) of the environment, the greater the decrease that the authentication entity uses when determining the duration.

Although the above examples describe the component of the first electronic device determining whether to authenticate the second electronic device, in other examples, the authentication entity may perform similar processes in order to determine whether to authenticate the second electronic device. For example, based on the first electronic device detecting the second electronic device and/or receiving the information from the second electronic device, the first electronic device may send the information to the authentication entity. The authentication entity may then perform the processes described above, with respect to the component, to determine whether to authenticate the second electronic device. In some instances, when the authentication entity determines to authenticate the second electronic device, the authentication entity may perform the authentication procedures described above and send the authentication data to the first electronic device. In some instances, when the authentication entity determines not to authenticate the second electronic device, the authentication entity may send an indication to the first electronic device that indicates that the second electronic device does not need to be authenticated.

In some instances, the first electronic device may establish a connection (e.g., a mechanical connection, a wireless connection, etc.) with the first electronic device based on determining that the second electronic device does not need to be authenticated and/or receiving the authentication data from the authentication entity. The first electronic device and the second electronic device may then communicate with one another using the connection. For example, the first electronic device may send data to and/or receive data from the second electronic device using the connection. In some instances, the first electronic device may continue to trust the second electronic device until the expiration of the duration associated with the authentication data. For example, once the duration expires, the first electronic device (and/or the component) may determine to reauthenticate the second electronic device.

By performing the processes described herein, the first electronic device is able to determine whether to authenticate the second electronic device even without user input. This may provide more security for devices that communicate with one another, especially when the communication includes a device-to-device communication. For example, before the first electronic device sends data to and/or receives data from the second electronic device (e.g., besides data that the second electronic device sends in order to attempt to establish the connection), the first electronic device determines that the second electronic device is a trusted device. Additionally, by using multi-factor authentication to authenticate the second electronic device, the user of the first electronic device may be required to verify that the second electronic device is trusted before the first electronic device establishes the connection with the second electronic device.

Although the examples described herein may refer to an electronic device and/or an authentication entity as participating in a multi-party cloud authentication system in a cloud networking environment, the techniques can generally be applied to any device or role, including an enterprise workforce scenario. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The user devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a first example environment 100 in accordance with the present cloud authentication concepts. The example environment 100 may include a cloud computing network 102 (e.g., network), one or more user devices 104, an electronic device 106, and/or one or more authentication devices 108 (e.g., an authentication entity). Parentheticals are utilized after a reference number to distinguish like elements. Use of the reference number without the associated parenthetical is generic to the element. For example, FIG. 1 includes two instances of a user device 104, including the user device 104(1), which may represent a desktop computer, and the user device 104(2), which may represent a mobile phone. In some scenarios, multiple user devices 104 may be associated with a single user. The authentication device(s) 108 may provide a remote, online service that the user devices 104 may use to authenticate other devices.

In some examples, the environment 100 comprises a data center or cloud-computing network comprising servers and other network components (e.g., routers, switches, etc.) stored across multiple data centers located across geographic areas. In these instances, the cloud-computing environment may be a distributed network through which devices interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs.

The user device(s) 104 and/or authentication device(s) 108 may be communicatively coupled among one another and/or to various other devices via cloud computing network 102. Within the example environment 100, a user device 104, an authentication device 108, and/or other devices may exchange communications (e.g., packets) via a network connection(s) to cloud computing network 102, indicated by double arrows 110. For instance, network connections 110 may be transport control protocol (TCP) network connections or any network connection (e.g., information-centric networking (ICN)) that enable the devices to exchange packets with other devices via cloud computing network 102. The network connections 110 represent, for example, a data path between a user device 104 and the authentication device(s) 108. For example, the user device 104 may be a computer, laptop, mobile device, tablet, etc., while the authentication device(s) 108 may be configured to provide data and/or network services to the user device 104. The authentication device(s) 108 may or may not be a producer, a point of generation and/or origination of the data. For instance, the data may originate elsewhere for the authentication device(s) 108 to be able to provide to the user device 104. Additionally, or alternatively, the data may pass through other network devices (e.g., router, switch) on a path from the authentication device(s) 108 to the user device 104. It should be appreciated that the term "network connection" may also be referred to as a "network path." The use of a cloud computing network in this example is not meant to be limiting. Other types of networks are contemplated in accordance with multi-party cloud authentication concepts.

At "Step 1," the user device 104(1) may communicate with the electronic device 106. The communication at Step 1 may include a person inserting the electronic device 106 into an input interface 112 (e.g., a device port) associated with the user device 104(1). In some instances, an authentication component 114 may then determine whether to authenticate the electronic device 106 using the authentication device(s) 108. In some instances, the authentication component 114 may determine to authenticate the electronic device 106 each time that the user device 104(1) detects the electronic device 106. Additionally, or alternatively, in some instances, the authentication component 114 may use one or more characteristics 116 associated with a state of an environment of the electronic device 106 in order to determine whether to authenticate the electronic device 106.

For example, the user device 104(1) may receive, from the electronic device 106, information 118 representing the characteristic(s) 116 associated with the state of the environment. The authentication component 114 may then analyze the characteristic(s) 116 in order to determine whether to authenticate the electronic device 106 using the authentication device(s) 108. In some instances, the authentication component 114 may determine to authenticate the electronic device 106 based on determining that the electronic device 106 includes anew electronic device for which the user device 104(1) has not previously connected. For a first example, the authentication component 114 may determine to authenticate the electronic device 106 based on the information 118 representing a new address (e.g., a new MAC address, a new IP address, etc.). For a second example, the authentication component 114 may determine to authenticate the electronic device 106 based on the information 118 representing a new identifier (e.g., a new unique device identifier).

Additionally, or alternatively, in some instances, the authentication component 114 may determine to authenticate the electronic device 106 based on transition(s) 120 associated with the environment of the electronic device 106. For example, the user device 104(1) may store information 118 representing previous characteristic(s) 116 associated with a previous state of the of the environment of the electronic device 106. The authentication component 114 may then compare the characteristic(s) 116 associated with the environment, as represented by the received information 118, to the previous characteristic(s) 116 associated with the environment. Based on the comparison, the authentication component 114 may identify the transition(s) 120 between the current state of the environment and the previous state(s) of the environment. The authentication component 114 may then use the transition(s) 120 to determine whether to reauthenticate the electronic device 106 using the authentication device(s) 108.

For a first example, if the transition(s) 120 indicate that the current state of the environment is similar to previous state(s) of the environment, then the authentication component 114 may determine not to reauthenticate the electronic device 106 using the authentication device(s) 108. As described above, the authentication component 114 may determine that the transition(s) indicate that the current state of the environment is similar to the previous state(s) of the environment when there is little variance between the compared characteristic(s) 116. For a second example, if the transition(s) 120 indicate that the current state of the environment is different than previous state(s) of the environment, then the authentication component 114 may determine to reauthenticate the electronic device 106 using the authentication device(s) 108. As described above, the authentication component 114 may determine that the transition(s) 120 indicate that the current state of the environment is different to the previous state(s) of the environment when there is a large variance between the compared characteristic(s) 116.

At "Step 2," the user device 104(1) may communicate with the authentication device(s) 108. The communication at Step 2 may include the user device 104(1) sending, to the authentication device(s) 108, a request 122 to authenticate the electronic device 106. In some instances, the communication at Step 2 may also include the user device 104(1) sending at least a portion of the information 118 to the authentication device(s) 108. The authentication device(s) 108 may receive the request 122 and/or the at least the portion of the information 118 from the user device 104(1) and authenticate the electronic device 106 for the user device 104(1). In some instances, the authentication device(s) 108 may perform multi-factor authentication in order to authenticate the user device 104(1).

For example, and at "Step 3," the authentication device(s) 108 may communicate with the user device 104(2). The communication at Step 3 may include providing the user device 104(2) with an authentication request 124 via a type of communication (e.g., via email, message, an application, push notification, etc.). The user device 104(2) may then receive input(s) representing a response 126 to the authentication request 124. For a first example, if the authentication request 124 includes a code that is emailed to the user, then the response 126 may include the emailed code. For a second example, if the authentication request 124 includes a question for the user, then the response 126 may include the answer to the question. Still, for a third example, if the authentication request 124 includes a push notification, then the response 126 may include the user selecting an interface element, such as a button, associated with the push notification. In either of the examples, the user device 104(2) may then send the response 126 back to the authentication device(s) 108.

The authentication device(s) 108 may then use the response 126 to authenticate the electronic device 106. For example, the authentication device(s) 108 may determine that the response 126 to the authentication request 124 is correct. The authentication device(s) 108 may then generate authentication data 128, such as a token, a cookie, and/or the like, that indicates that the authentication device(s) 108 have authenticated the electronic device 106. In some instances, the authentication data 128 includes at least a duration for which the electronic device 106 is authenticated. For example, after the duration expires, the user device 104(1) may reauthenticate the electronic device 106 using the authentication device(s) 108.

At "Step 4," the authentication device(s) 108 may communicate with the user device 104(1). The communication at Step 4 may include the authentication device(s) 108 sending the authentication data 128 to the user device 104(1). The user device 104(1) may then use the authentication data 128 to determine that the authentication device(s) 108 have authenticated the electronic device 108. As such, the user device 104(1) may determine to establish the connection with the electronic device 106. Additionally, or alternatively, in some instances, the user device 104(1) may begin sending data to and/or receiving data from the electronic device 106.

In some instances, the authentication component 114 may include software that is placed within one or more communication stacks 130 of the user device 104(1), where the communication stack(s) 130 are used to communicate with at least the electronic device 106. For example, if the electronic device 106 includes the USB device, then the authentication component 114 may include software that is placed within the device driver associated with the USB port. In some instances, the authentication component 114 is placed within one or more layers of the communication stack(s) 130. For example, the authentication component 114 may be placed within the first layer, the second layer, the third layer, the fourth layer, the fifth layer, and/or the like associated with the communication stack(s) 130. In some instances, the authentication component 114 is placed within a layer of a communication stack 130 that is associated with the type of characteristic 116 the authentication component 114 is analyzing in order to determine whether the authenticate the electronic device 106.

As further illustrated in the example of FIG. 1, the user device 104(1) includes processor(s) 132 and the memory 134, the authentication device(s) 108 include processor(s) 136 and memory 138, and the user device 104(2) includes processor(s) 140 and memory 142. As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Figure 2:
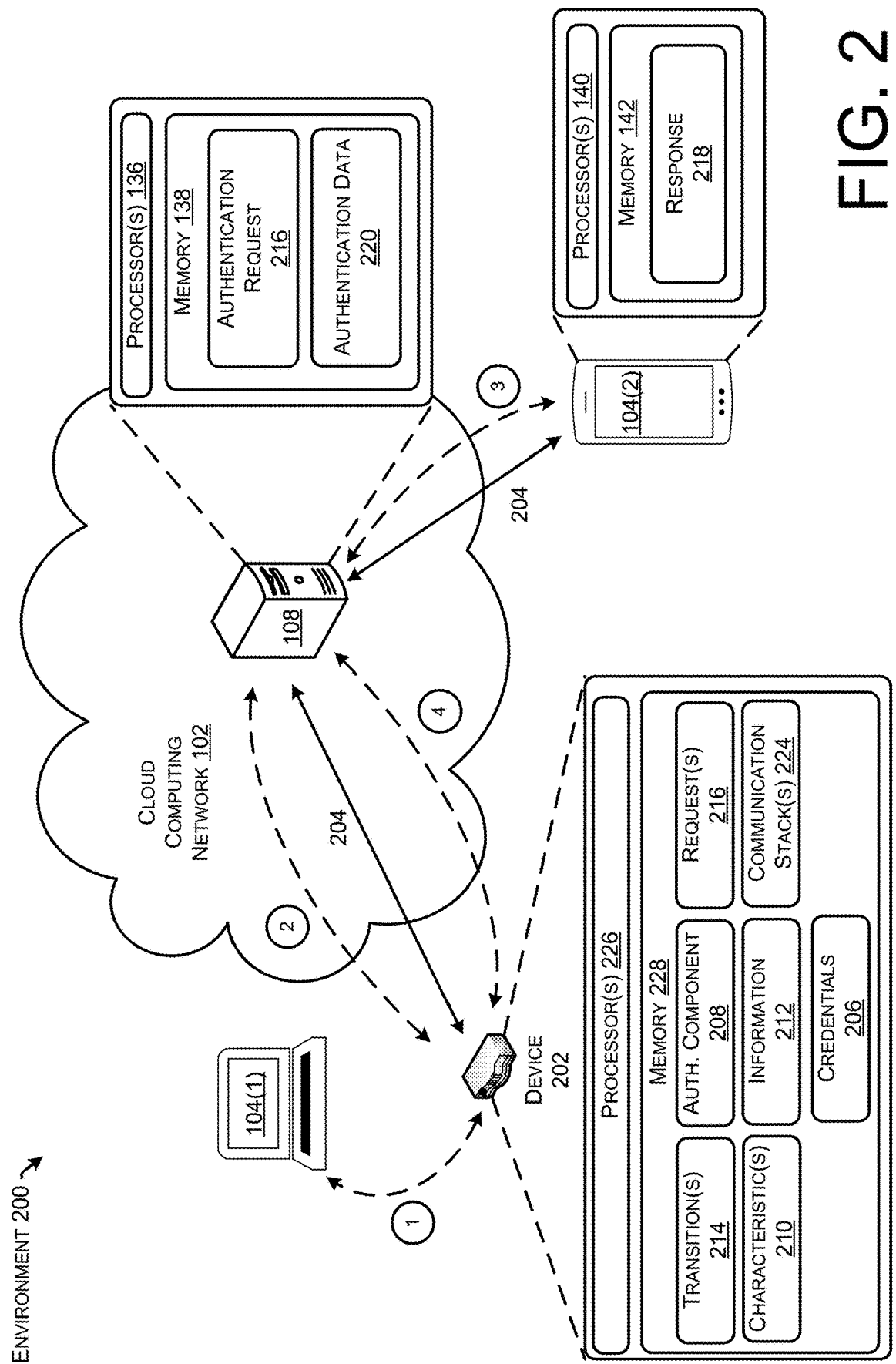
FIG. 2 illustrates a component diagram with a second example environment in which cloud authentication concepts may be employed, in accordance with the present concepts.

FIG. 2 illustrates a second example environment 200 in accordance with the present cloud authentication concepts. The example environment 200 may include the cloud computing network 102 (e.g., network), the one or more user devices 104, an electronic device 202, and/or the one or more authentication devices 108 (e.g., an authentication entity).

The user device(s) 104, the electronic device, 202, and/or the authentication device(s) 108 may be communicatively coupled among one another and/or to various other devices via cloud computing network 102. Within the example environment 200, a user device 104, the electronic device 202, an authentication device 108, and/or other devices may exchange communications (e.g., packets) via a network connection(s) to cloud computing network 102, indicated by double arrows 204. For instance, network connections 204 may be transport control protocol (TCP) network connections or any network connection (e.g., information-centric networking (ICN)) that enable the devices to exchange packets with other devices via cloud computing network 102. The network connections 204 represent, for example, a data path between a user device 104, the electronic device 202, and the authentication device(s) 108. For example, the user device 104 may be a computer, laptop, mobile device, tablet, etc., while the authentication device(s) 108 may be configured to provide data and/or network services to the user device 104. The authentication device(s) 108 may or may not be a producer, a point of generation and/or origination of the data. For instance, the data may originate elsewhere for the authentication device(s) 108 to be able to provide to the user device 104. Additionally, or alternatively, the data may pass through other network devices (e.g., router, switch) on a path from the authentication device(s) 108 to the user device 104. It should be appreciated that the term "network connection" may also be referred to as a "network path." The use of a cloud computing network in this example is not meant to be limiting. Other types of networks are contemplated in accordance with multi-party cloud authentication concepts.

At "Step 1," the user device 104(1) may communicate with the electronic device 202. The communication at Step 1 may include the user device 104(1) attempting to establish a connection with the electronic device 202. For example, the electronic device 202 may include a network device, such as a router. To establish the connection, the electronic device 202 may receive credentials 206 from the user device 104(1). The credential 206 may include, but are not limited to, an identifier (e.g., a Service Set Identifier) and a password. The electronic device 202 may then use the credentials 206 in order to perform an initial authentication of the user device 104(1). For example, the electronic device 202 may match the credentials 206 to stored credentials associated with a user account. Based on the match, the electronic device 202 may initially authenticate the user device 104(1).

In some instances, an authentication component 208 may then determine whether to further authenticate the user device 104(1) using the authentication device(s) 108. In some instances, the authentication component 208 may determine to further authenticate the user device 104(1) each time that the user device 104(1) attempts to connect to the electronic device 202. Additionally, or alternatively, in some instances, the authentication component 208 may use one or more characteristics 210 associated with a state of an environment of the use device 104(1) in order to determine whether to authenticate the user device 104(1).

For example, the electronic device 202 may receive, from the user device 104(1), information 212 representing the characteristic(s) 210 associated with the state of the environment. The authentication component 208 may then analyze the characteristic(s) 210 in order to determine whether to authenticate the user device 104(1) using the authentication device(s) 108. In some instances, the authentication component 208 may determine to authenticate the user device 104(1) based on determining that the user device 104(1) includes a new electronic device for which the electronic device 202 has not previously connected. For a first example, the authentication component 208 may determine to authenticate the user device 104(1) based on the information 212 representing a new address (e.g., a new MAC address, a new IP address, etc.). For a second example, the authentication component 208 may determine to authenticate the user device 104(1) based on the information 212 representing a new identifier (e.g., a new unique device identifier).

Additionally, or alternatively, in some instances, the authentication component 208 may determine to authenticate the user device 104(1) based on transition(s) 214 associated with the environment of the user device 104(1). For example, the electronic device 202 may store information representing previous characteristic(s) 210 associated with a previous state of the of the environment of the user device 104(1). The authentication component 208 may then compare the characteristic(s) 210 associated with the environment, as represented by the received information 212, to the previous characteristic(s) 210 associated with the environment. Based on the comparison, the authentication component 208 may identify the transition(s) 214 between the current state of the environment and the previous state(s) of the environment. The authentication component 208 may then use the transition(s) 214 to determine whether to reauthenticate the user device 104(1) using the authentication device(s) 108.

For a first example, if the transition(s) 214 indicate that the current state of the environment is similar to previous state(s) of the environment, then the authentication component 208 may determine not to reauthenticate the user device 104(1) using the authentication device(s) 108. As described above, the authentication component 208 may determine that the transition(s) 214 indicate that the current state of the environment is similar to the previous state(s) of the environment when there is little variance between the compared characteristic(s) 210. For a second example, if the transition(s) 214 indicate that the current state of the environment is different than previous state(s) of the environment, then the authentication component 208 may determine to reauthenticate the user device 104(1) using the authentication device(s) 108. As described above, the authentication component 208 may determine that the transition(s) 214 indicate that the current state of the environment is different to the previous state(s) of the environment when there is a large variance between the compared characteristic(s) 210.

At "Step 2," the electronic device 202 may communicate with the authentication device(s) 108. The communication at Step 2 may include the electronic device 202 sending, to the authentication device(s) 108, a request 216 to authenticate the user device 104(1). In some instances, the communication at Step 2 may also include the electronic device 202 sending at least a portion of the information 212 to the authentication device(s) 108. The authentication device(s) 108 may receive the request 216 and/or the at least the portion of the information 212 from the electronic device 202 and authenticate the user device 104(1) for the electronic device 202. In some instances, the authentication device(s) 108 may perform multi-factor authentication in order to authenticate the user device 104(1).

For example, and at "Step 3," the authentication device(s) 108 may communicate with the user device 104(2). The communication at Step 3 may include providing the user device 104(2) with an authentication request 218 via a type of communication (e.g., via email, message, an application, push notification, etc.). The user device 104(2) may then receive input(s) representing a response 220 to the authentication request 218. For a first example, if the authentication request 218 includes a code that is emailed to the user, then the response 220 may include the emailed code. For a second example, if the authentication request 218 includes a question for the user, then the response 220 may include the answer to the question. Still, for a third example, if the authentication request 218 includes a push notification, then the response 220 may include the user selecting an interface element, such as a button, associated with the push notification. In either of the examples, the user device 104(2) may then send the response 220 back to the authentication device(s) 108.

The authentication device(s) 108 may then use the response 220 to authenticate the user device 104(1). For example, the authentication device(s) 108 may determine that the response 220 to the authentication request 218 is correct. The authentication device(s) 108 may then generate authentication data 222, such as a token, a cookie, and/or the like, that indicates that the authentication device(s) 108 have authenticated the user device 104(1). In some instances, the authentication data 222 includes at least a duration for which the user device 104(1) is authenticated. For example, after the duration expires, the electronic device 202 may reauthenticate the user device 104(1) using the authentication device(s) 108.

At "Step 4," the authentication device(s) 108 may communicate with the electronic device 202. The communication at Step 4 may include the authentication device(s) 108 sending the authentication data 222 to the electronic device 202. The electronic device 202 may then use the authentication data 222 to determine that the authentication device(s) 108 have authenticated the user device 104(1). As such, the electronic device 202 may determine to establish the connection with the user device 104(1). Additionally, or alternatively, in some instances, the electronic device 202 may begin sending data to and/or receiving data from the user device 104(1).

In some instances, the authentication component 208 may include software that is placed within one or more communication stacks 224 of the electronic device 202, where the communication stack(s) 224 are used to communicate with at least the user device 104(1). In some instances, the authentication component 208 is placed within one or more layers of the communication stack(s) 224. For example, the authentication component 208 may be placed within the first layer, the second layer, the third layer, the fourth layer, the fifth layer, and/or the like associated with the communication stack(s) 224.

As further illustrated in the example of FIG. 2, the electronic device 202 includes processor(s) 226 and the memory 228.

It should be noted that FIGS. 1 and 2 illustrate only two examples of when an electronic device may determine to authenticate another electronic device. However, similar processes may be performed by any other electronic device when attempting to establish a physical and/or wireless connection with another device. For example, if an electronic device is attempting to establish wireless connect(s) with multiple other electronic devices, such as multiple Internet of Things (IoT) devices, the electronic device may perform similar processes as those described above in order to authenticate one or more of the IoT devices.

Figure 3:
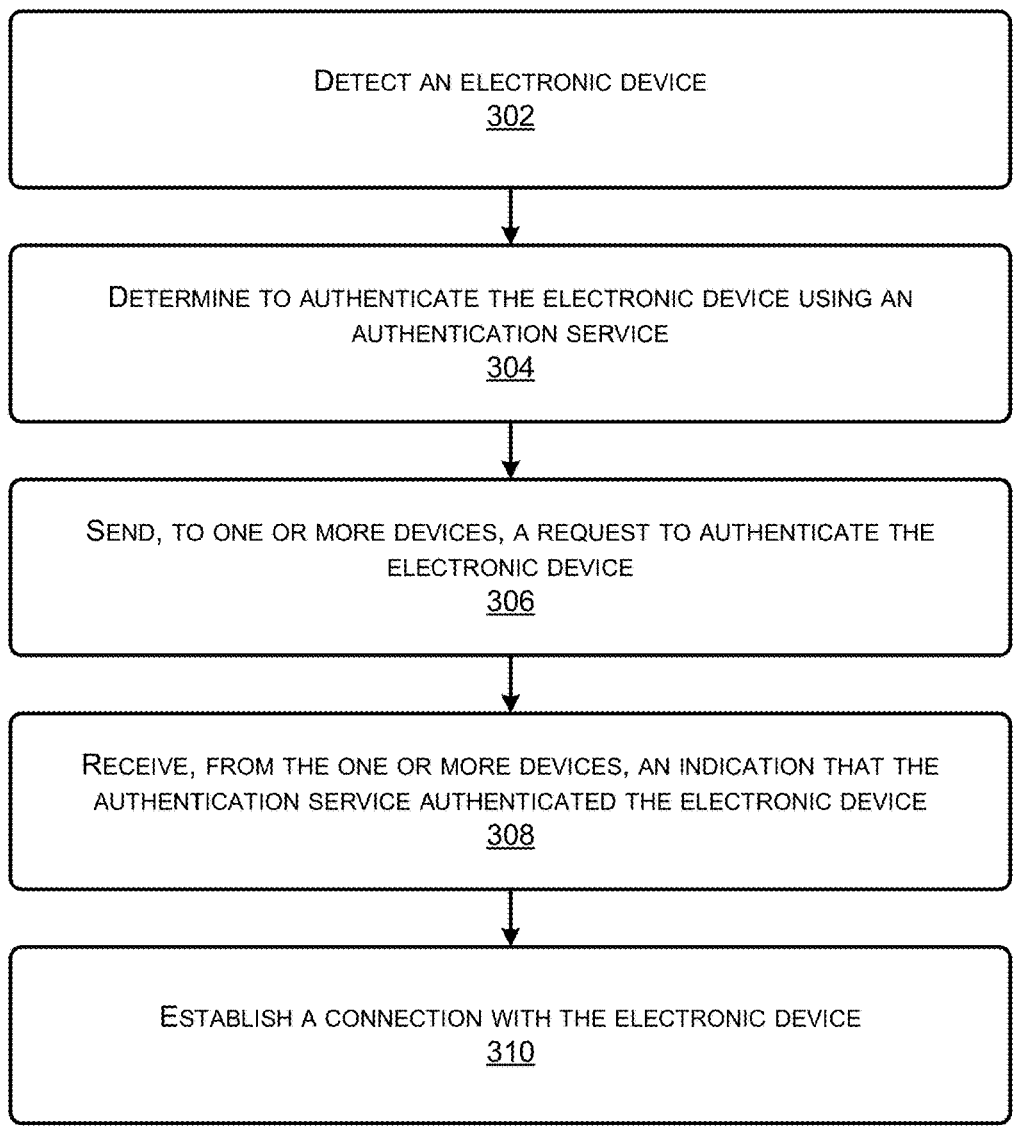
FIG. 3 illustrates a flow diagram of a first example method for authenticating an electronic device using an authentication entity.

FIG. 3 illustrates a flow diagram of a first example method 300 for authenticating an electronic device using an authentication entity. An operation 302 represents detecting an electronic device. For instance, a first electronic device (e.g., the user device 104(1), the electronic device 202, etc.) may detect a second electronic device using one or more techniques. For a first example, the first electronic device may detect the second electronic device based on the second electronic device being physically attached to the first electronic device (e.g., inserted into an input interface of the first electronic device). For a second example, the first electronic device may detect the second electronic device based on receiving, from the second electronic device, a request to establish a connection with the first electronic device. In some instances, the request may further include credentials associated with a user account.

An operation 304 represents determining to authenticate the electronic device using an authentication service. For instance, the first electronic device may use an authentication component to determine to authenticate the second electronic device using the authentication service. In some instances, the component is included in a communication stack associated with the first electronic device. In some instances, the component makes the determination using information received from the second electronic device. For a first example, the component may determine to authenticate the second electronic device based on the first electronic device having not previously connected to the second electronic device. For a second example, the component may determine to authenticate the second electronic device based on transition(s) associated with an environment of the second electronic device.

An operation 306 represents sending, to one or more devices, a request to authenticate the electronic device. For instance, the first electronic device may send the request to the device(s) (e.g., the authentication device(s) 108) associated with the authentication service. In some instance, the first electronic device may further send at least a portion of the information received from the second electronic device. The device(s) associated with the authentication service may then authenticate the second electronic device for the first electronic device. In some instances, the device(s) authenticate the second electronic device using multi-factor authentication. For example, the device(s) may send, to a user associated with the first electronic device, an authentication request. The device(s) may then receive a response to the authentication request and authenticate the second electronic device using the response.

An operation 308 represents receiving, from the one or more devices, an indication that the authentication service authenticated the electronic device and an operation 310 represents establishing a connection with the electronic device. For instance, the first electronic device may receive, from the device(s) associated with the authentication service, authentication data indicating that the authentication services authenticated the second electronic device. In some instances, the authentication data may include a duration for which the second electronic device is authenticated. The first electronic device may then use the authentication data in order to determine that the second electronic device includes a trusted device. As such, the first electronic device may establish the connection in order to communicate data between the first electronic device and the second electronic device.

Figure 4:
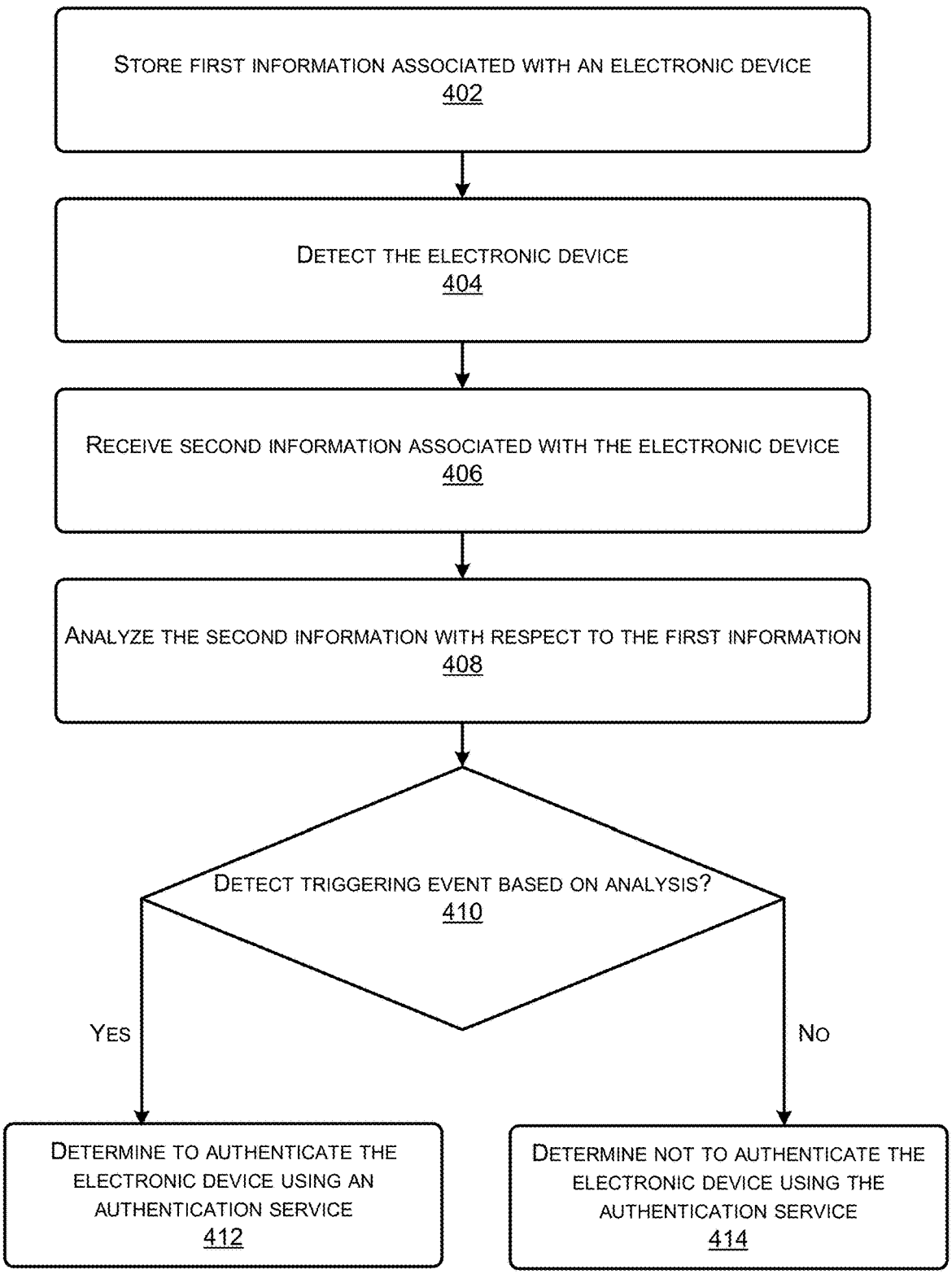
FIG. 4 illustrates a flow diagram of a second example method for authenticating an electronic device using an authentication entity.

FIG. 4 illustrates a flow diagram of a second example method 400 for authenticating an electronic device using an authentication entity. An operation 402 represents storing first information associated with an electronic device. For instance, a first electronic device (e.g., the user device 104(1), the electronic device 202, etc.) may store the first information associated with the second electronic device. In some instances, the first information represents characteristic(s) associated with previous state(s) of an environment of the second electronic device, such as state(s) of the environment during previous session(s) when the second electronic device was authenticated for the first electronic device. In some instances, the first information represents characteristic(s) of the second electronic device that the first electronic device determines using one or more machine learned models.

An operation 404 represents detecting the electronic device. For instance, the first electronic device may detect the second electronic device using one or more techniques. For a first example, the first electronic device may detect the second electronic device based on the second electronic device being physically attached to the first electronic device (e.g., inserted into an input interface of the first electronic device). For a second example, the first electronic device may detect the second electronic device based on receiving, from the second electronic device, a request to establish a connection with the first electronic device. In some instances, the request may further include credentials associated with a user account.

An operation 406 represents receiving second information associated with the electronic device. For instance, based on detecting the second electronic device, the first electronic device may receive the second information. In some instances, the second information represents characteristic(s) associated with a current state of the environment of the second electronic device.

An operation 408 represents analyzing the second information with respect to the first information. For instance, the first electronic device may analyze the second information with respect to the first information. In some instances, the analysis includes comparing the characteristic(s) represented by the second information to the characteristic(s) represented by the first information in order to determine whether transition(s) occurred with the state of the environment. As described herein, the transition(s) may include, but are not limited to, a change in the unique device identifier, a change in the hardware associated with the second electronic device, a change in the software installed on the second electronic device, a change in the one or more applications that are active on the second electronic device, a change in the CPU usage associated with the second electronic device, a change in the memory usage associated with the second electronic device, a change in the address associated with the second electronic device, a change in the power consumption associated with the second electronic device (e.g., whether the second electronic device was continuously receiving power or whether the second electronic device stopped receiving power for period(s) of time), a change in the type of network connection associated with the second electronic device, a change in the user of the second electronic device (as determined using the sensor data), a change in the location of the second electronic device, and/or any other state change.

An operation 410 represents determining whether a triggering event is detected. For instance, the first electronic device may determine whether the triggering event is detected based on the analysis. For a first example, the first electronic device may determine that the triggering event is detected based on a transition indicating a change in an address (e.g., MAC address, IP address, etc.) associated with the second electronic device. For a second example, the first electronic device may determine that the triggering event is detected based on a transition indicating a change in an identifier (e.g., a unique device identifier) associated with the second electronic device. While these are just a couple of examples of triggering events that may be detected, in other examples, the first electronic device may detect additional and/or alternative triggering events.

If, at operation 410, it is determined that the triggering event is detected, then an operation 412 represents determining to authenticate the electronic device using an authentication service. For instance, if the first electronic device determines that the triggering event is detected, then the first electronic device may authenticate the second electronic device using the authentication service. In some instances, to authenticate the second electronic device, the first electronic device may send a request to device(s) (e.g., the authentication device(s) 108) associated with the authentication service. In some instance, the first electronic device may further send at least a portion of the second information received from the second electronic device. The device(s) associated with the authentication service may then authenticate the second electronic device for the first electronic device. In some instances, the device(s) authenticate the second electronic device using multi-factor authentication. The first electronic device may then receive, from the device(s), an indication that the authentication service has authenticated the second electronic device.

However, if, at operation 410, it is determined that the triggering event is not detected, then an operation 414 represents determining not to authenticate the electronic device using the authentication service. For instance, if the first electronic device determines that the triggering event is not detected, then the first electronic device determine not to authenticate the second electronic device using the authentication service. Rather, the first electronic device may establish a connection with the second electronic device, where the first electronic device and the second electronic device use the connection for sending and receiving data with one another.

It should be noted that, although the example of FIG. 4 describes the first electronic device as performing the operations, in other examples, the authentication device(s) 108 may perform at least some of the operations. For instance, based on the first electronic device detecting the second electronic device, the first electronic device may send the second information to the authentication device(s) 108. The authentication device(s) 108, which may already store the first information, may then analyze the second information with respect to the first information in order to determine whether the triggering event is detected. If the triggering event is detected, then the authentication device(s) 108 may authenticate the second electronic device, such as by using multi-factor authentication. However, if the triggering event is not detected, then the authentication device(s) 108 may not authenticate the second electronic device. Rather, the authentication device(s) 108 may send, to the first electronic device, an indication that the second electronic device includes a trusted device.

Figure 5:
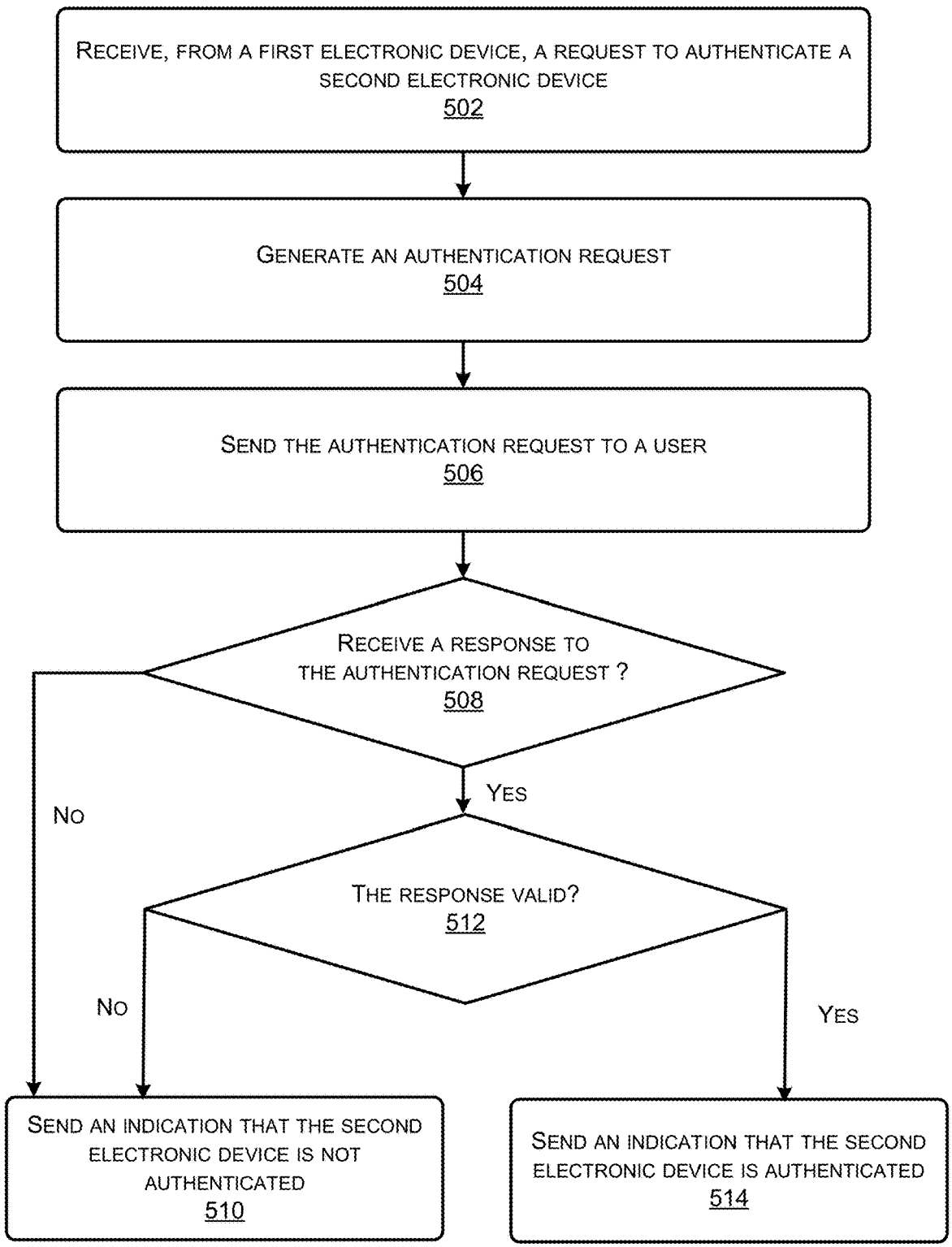
FIG. 5 illustrates a flow diagram of a third example method for authenticating an electronic device using an authentication entity.

FIG. 5 illustrates a flow diagram of a third example method 500 for authenticating an electronic device using an authentication entity. An operation 502 represents receiving, from a first electronic device, a request to authenticate a second electronic device. For instance, the authentication device(s) 108 may receive, from the first electronic device, the request to authenticate the second electronic device. In some instances, the authentication device(s) 108 receive the request based on the second electronic device attempting to communicate with the first electronic device. In some instances, the authentication device(s) 108 may further receive information representing a current state of an environment associated with the second electronic device.

An operation 504 represents generating an authentication request and an operation 506 represents sending the authentication request to a user. For instance, the authentication device(s) 108 may generate the authentication request that is associated with authenticating the second electronic device. As described herein, the authentication request may include, but is not limited to, a code, a question, a password, a push notification, and/or any other factor that may be used to authenticate the second electronic device. The authentication device(s) 108 may then send the authentication request to the user via email, message, an application, push notification, and/or the like.

An operation 508 represents determining whether a response to the authentication request has been received. For instance, the authentication device(s) 108 may determine if the response has been received from the first electronic device and/or another electronic device. If, at operation 508, it is determined that the response has not been received, then an operation 510 represents sending an indication that the second electronic device is not authenticated. For instance, if the authentication device(s) 108 do not receive the response to the authentication request, then the authentication device(s) 108 may determine that the second electronic device is not authenticated. As such, the authentication device(s) 108 may send, to the first electronic device, the indication that the second electronic device has not been authenticated.

However, if, at operation 508, it is determined that the response has been received, then an operation 512 represents determining whether the response is valid. For instance, if the authentication device(s) 108 receive the response, then the authentication device(s) 108 may determine if the response is valid. If, at operation 512, it is determined that the response is not valid, then the operation 510 again represents sending the indication that the second electronic device is not authenticated. For instance, if the authentication device(s) 108 determine that the response is not valid, then the authentication device(s) 108 may determine that the second electronic device is again not authenticated. As such, the authentication device(s) 108 may send, to the first electronic device, the indication that the second electronic device has not been authenticated.

However, if, at operation 512, it is determined that the response is valid, then an operation 514 represents sending an indication that the second electronic device is authenticated. For instance, if the authentication device(s) 108 determine that the response is valid, then the authentication device(s) 108 may authenticate the second electronic device. As such, the authentication device(s) 108 may send, to the first electronic device, the indication that the second electronic device has been authenticated.

Figure 6:
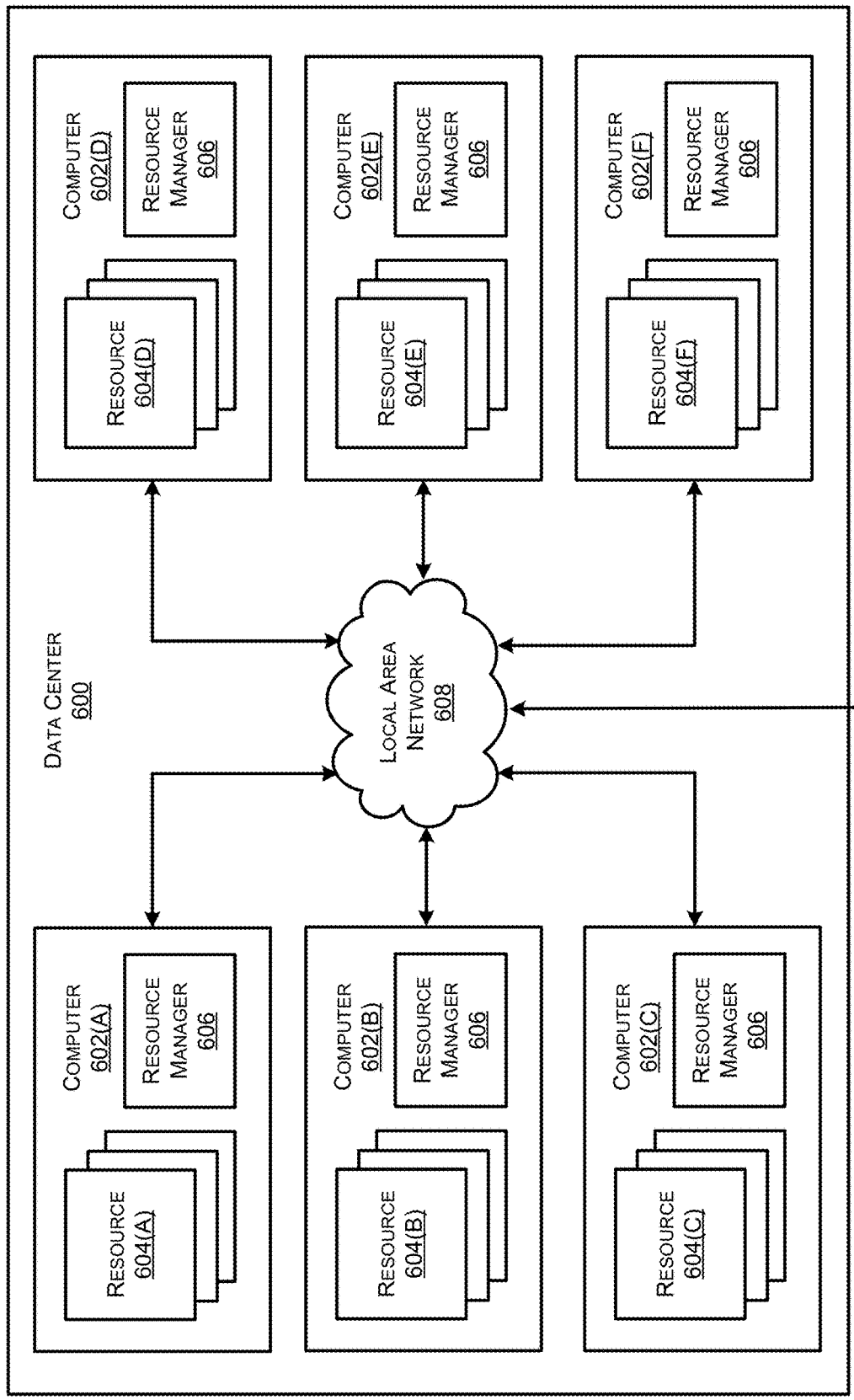
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several computers 602A-602F (which might be referred to herein singularly as "a computer 602" or in the plural as "the computers 602") for providing computing resources. In some examples, the resources and/or computers 602 may include, or correspond to, any type of networked device described herein, such as the authentication device(s) 108. Although, computers 602 may comprise any type of networked device, such as servers, switches, routers, hubs, bridges, gateways, modems, repeaters, access points, hosts, etc.

The computers 602 can be standard tower, rack-mount, or blade server computers configured appropriately for providing computing resources. In some examples, the computers 602 may provide computing resources 604 including data processing resources such as virtual machine (VM) instances or hardware computing systems, database clusters, computing clusters, storage clusters, data storage resources, database resources, networking resources, and others. Some of the computers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single computer 602. Computers 602 in the data center 600 can also be configured to provide network services and other types of services.

In the example data center 600 shown in FIG. 6, an appropriate local area network (LAN) 608 is also utilized to interconnect the computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the computers 602A-602F in each data center 600, and, potentially, between computing resources in each of the computers 602. It should be merely illustrative and that other implementations can be utilized.

In some examples, the computers 602 may each execute one or more application containers and/or virtual machines to perform techniques described herein. For instance, the containers and/or virtual machines may serve as server devices, user devices, and/or routers in the cloud computing network 102.

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute Applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
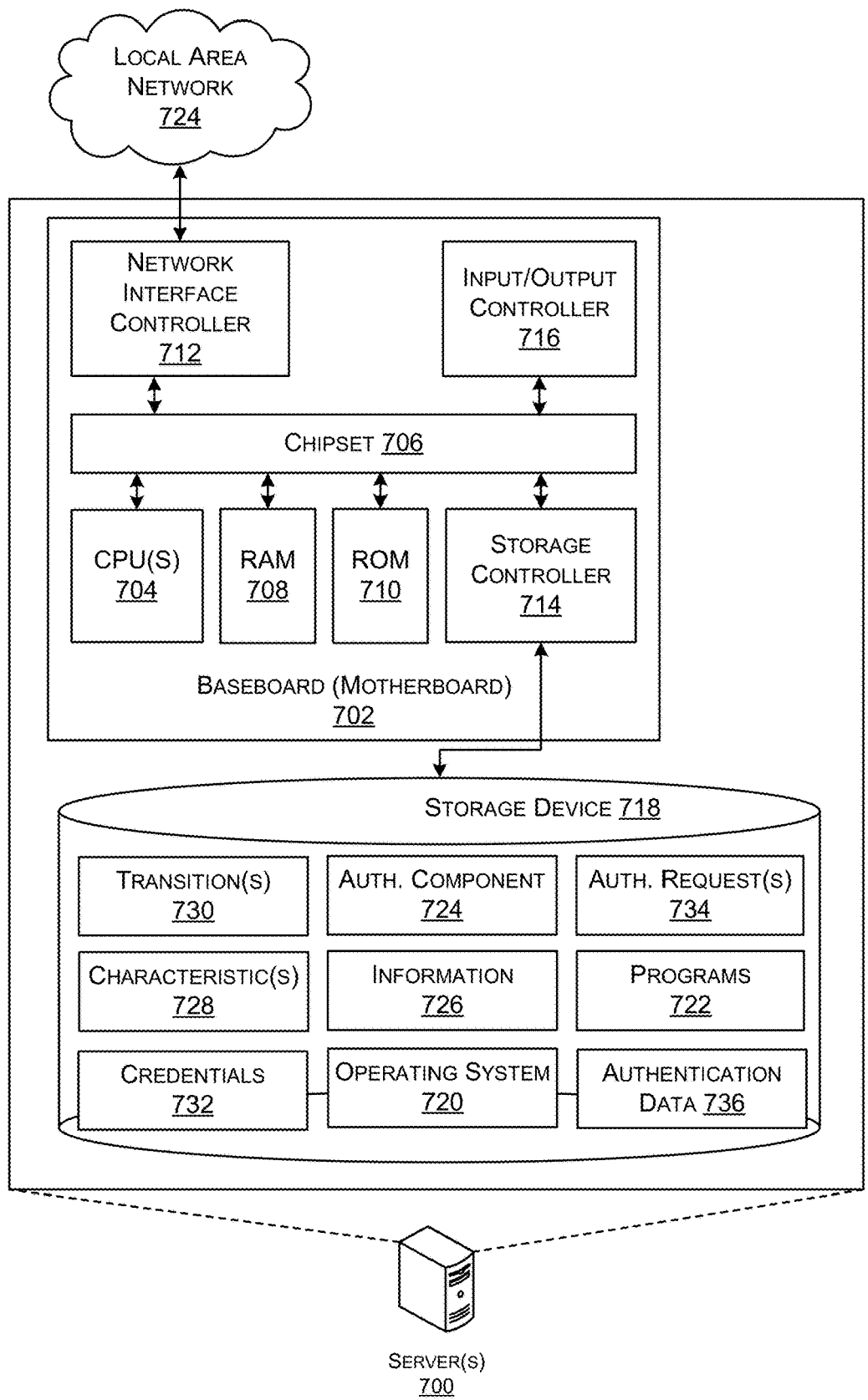
FIG. 7 is a computer architecture diagram showing an illustrative computer hardware architecture for implementing a server computing device that can be utilized to implement aspects of the various technologies presented herein.

FIG. 7 is a computer architecture diagram showing an illustrative computer hardware architecture for implementing a server computing device 700 that can be utilized to implement aspects of the various technologies presented herein. The authentication device(s) 108, discussed above, may include some or all of the components discussed below with reference to the server computing device 700.

To begin, the server computer 700 can be standard tower, rack-mount, or blade server computers configured appropriately for providing the computing resources described herein. As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the servers 700 can also be configured to execute a resource manager capable of instantiating and/or managing the computing resources. In the case of VM instances, for example, the resource manager can be a hypervisor or another type of program configured to enable the execution of multiple VM instances on a single server computer 700. Server computers 700 in a data center can also be configured to provide network services and other types of services.

The server computer 700 includes a baseboard 702, or "motherboard," which is a printed circuit board to which a multitude of components or devices can be connected by way of a system bus or other electrical communication paths. In one illustrative configuration, one or more central processing units (CPUs) 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as a local area network 724. The chipset 706 can include functionality for providing network connectivity through a Network Interface Card (NIC) 712, such as a gigabit Ethernet adapter. The NIC 712 is capable of connecting the computer 700 to other computing devices over the network. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI (SAS) interface, a serial advanced technology attachment (SATA) interface, an FC interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the computer 700, and or any components included therein, may be supported by one or more devices similar to computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 3-5. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

The server computer 700 may also store, in the storage device 718, an authentication component 724 (which may operate similar to the authentication component 114 and/or the authentication component 208), information 726 (which may include, and/or represent, the information 118 and/or the information 212), characteristic(s) 728 (which may include, and/or represent, the characteristic(s) 116 and/or the characteristic(s) 210), transition(s) 730 (which may include, and/or represent, the transition(s) 120 and/or the transition(s) 214), credential(s) 732 (which may include, and/or represent, the credential(s) 206), authentication request(s) 734 (which may include, and/or represent, the authentication request 124 and/or the authentication request 218), and authentication data 736 (which may include, and/or represent, the authentication data 128 and/or the authentication data 222).

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A first electronic device comprising:
   one or more processors;
   memory storing a communication stack usable to establish communication paths with other electronic devices; and
   one or more non-transitory computer-readable media storing instructions that, when executed by the one or more processors, cause the one or more processors to perform operations comprising:
   determining, by a component placed in a Layer 2 (L2) or Layer 3 (L3) of the communication stack, that a second electronic device is attempting to establish an L2 or L3 communication path with the first electronic device;
   prior to communicating application data and prior to establishing any L2 or L3 communication path with the second electronic device:
      determining, by the component of the communication stack, to authenticate the second electronic device with an authentication service;
      sending, to one or more devices associated with the authentication service, a request to authenticate the second electronic device; and
      receiving, from the one or more devices, an indication that the one or more devices authenticated the second electronic device;
   based at least in part on the second electronic device being authenticated, allowing the second electronic device to establish the L2 or L3 communication path with the first electronic device; and
   at least partly using the L2 or L3 communication path, establishing a Layer 7 (L7) communication session with the second electronic device by proceeding through the communication stack.

2. The first electronic device as recited in claim 1, wherein sending the request to authenticate the second electronic device comprises sending, to the one or more devices, the request to authenticate the second electronic device using multi-factor authentication.

3. The first electronic device as recited in claim 1, the operations further comprising:
   receiving, from the second electronic device, information associated with the second electronic device,
   wherein:
   determining to authenticate the second electronic device is based at least in part on the information; and
   the information represents at least one of:
      a media access control address associated with the second electronic device;
      an Internet Protocol address associated with the second electronic device;
      connection information associated with the second electronic device;
      a location associated with the second electronic device;
      a time period associated with a previous connection with the second electronic device; or
      an action to be performed by the second electronic device.

4. The first electronic device as recited in claim 1, the operations further comprising:
   receiving, from the second electronic device, information representing an environment of the second electronic device, wherein determining to authenticate the second electronic device is based at least in part on the information;
   determining, based at least in part on the information, that the first electronic device has not connected to the second electronic device,
   and wherein determining to authenticate the second electronic device is based at least in part on the first electronic device not having connected with the second electronic device.

5. The first electronic device as recited in claim 1, further comprising:
   an input interface,
   and wherein determining that the second electronic device is attempting to establish the L2 or L3 communication path comprises detecting that the second electronic device was inserted into the input interface.

6. The first electronic device as recited in claim 1, the operations further comprising:
   receiving credentials from the second electronic device;
   authenticating the second electronic device using at least the credentials and the indication; and
   based at least in part on authenticating the second electronic device, establishing the L2 or L3 communication path with the second electronic device.

7. The first electronic device of claim 1, wherein:
   the second electronic device is a Universal Serial Bus (USB) device;
   the component is placed within a device driver of a USB port of the first electronic device; and
   determining that the second electronic device is attempting to establish the L2 or L3 communication path includes detecting the USB device being inserted into a USB port of the first electronic device.

8. A method comprising:
receiving, at a first electronic device, a request from a second electronic device to establish a Layer 2 (L2) or Layer 3 (L3) network connection with the first electronic device;
prior to communicating application data and prior to establishing any L2 or L3 network connection:
determining, by a component placed in an L2 or L3 of a communication stack, to authenticate the second electronic device with an authentication service;
sending, to one or more devices associated with the authentication service, a request to authenticate the second electronic device; and
receiving, from the one or more devices, an indication that the one or more devices authenticated the second electronic device;
based at least in part on the second electronic device being authenticated, allowing the second electronic device to establish the L2 or L3 network connection with the first electronic device; and
at least partly using the L2 or L3 network connection, establishing a Layer 7 (L7) communication session with the second electronic device.

9. The method as recited in claim 8, wherein determining to authenticate the second electronic device comprises:
receiving data from the second electronic device;
analyzing the data using the component of the communication stack associated with the first electronic device; and
determining, by the component, to authenticate the second electronic device based at least in part on analyzing the data.

10. The method as recited in claim 8, further comprising:
receiving, from the second electronic device, information associated with the second electronic device,
wherein:
determining to authenticate the second electronic device is based at least in part on the information; and
the information represents at least one of:
a media access control address associated with the second electronic device;
an Internet Protocol address associated with the second electronic device;
connection information associated with the second electronic device;
a location associated with the second electronic device;
a time period associated with a previous connection with the second electronic device; or
an action to be performed by the second electronic device.

11. The method as recited in claim 8, further comprising:
receiving, from the second electronic device, information representing an environment of the second electronic device, wherein determining to authenticate the second electronic device is based at least in part on the information;
determining, based at least in part on the information, that the second electronic device includes a new electronic device,
and wherein determining to authenticate the second electronic device is based at least in part on the second electronic device including the new electronic device.

12. The method as recited in claim 8, wherein determining that the second electronic device is attempting to establish the L2 or L3 network connection comprises detecting, by the first electronic device, that the second electronic device was inserted into an input interface of the first electronic device.

13. The method as recited in claim 8, further comprising:
receiving credentials from the second electronic device;
authenticating the second electronic device using at least the credentials and the indication; and
based at least in part on authenticating the second electronic device, establishing the L2 or L3 network connection with the second electronic device.

14. A first electronic device comprising:
one or more processors;
memory storing a communication stack usable to establish communication paths with other electronic devices; and
one or more non-transitory computer-readable media storing instructions that, when execute i by the one or more processors, cause the one or more processors to perform operations comprising:
determining, by a component placed in a Layer 2 (L2) or Layer 3 (L3) of the communication stack, that a second electronic device is attempting to establish in L2 or L3 communication path with the first electronic device;
prior to communicating application data and prior to establishing any L2 or L3 communication path with the second electronic device:
determining, by the component of the communication stack, to authenticate the second electronic device with an authentication service;
sending, to one or more devices associated with the authentication service, a request to authenticate the second electronic device; and
receiving, from the one or more devices, an indication that the one or more devices authenticated the second electronic device; and
based at least in part on the second electronic device being authenticated, allowing the second electronic device to establish the L2 or L3 communication path with the first electronic device.

15. The first electronic device of claim 14, wherein the component is software that is installed in the L3 of the communication stack, the L3 of the communication stack being a network layer,
the operations further comprising, prior to establishing the L2 or L3 communication path:
receiving L3 information from the second electronic device, the L3 information including an Internet Protocol (IP) address of the second electronic device; and
sending the L3 information to the one or more devices associated with the authentication service with the request to authenticate the second electronic device.

16. The first electronic device of claim 14,
the operations further comprising:
receiving information from the second electronic device, the information including a last known location of the second electronic device or a last known connection of the second electronic device; and
sending the information to the one or more devices associated with the authentication service with the request to authenticate the second electronic device.

* * * * *